United States Patent
Endle et al.

(10) Patent No.: US 10,254,127 B2
(45) Date of Patent: Apr. 9, 2019

(54) METHOD FOR REMOTELY READING ELECTRIC METERS

(75) Inventors: Christophe Endle, Rueil Malmaison (FR); Rodolphe Gissat, Rueil-Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 1157 days.

(21) Appl. No.: 12/994,722

(22) PCT Filed: May 27, 2009

(86) PCT No.: PCT/FR2009/000610
§ 371 (c)(1),
(2), (4) Date: Aug. 15, 2011

(87) PCT Pub. No.: WO2009/147314
PCT Pub. Date: Dec. 10, 2009

(65) Prior Publication Data
US 2012/0038487 A1      Feb. 16, 2012

(30) Foreign Application Priority Data

Jun. 5, 2008    (FR) ...................................... 08 03119

(51) Int. Cl.
*G01D 4/00*      (2006.01)
(52) U.S. Cl.
CPC ............ *G01D 4/004* (2013.01); *Y02B 90/242* (2013.01); *Y02B 90/246* (2013.01); *Y04S 20/322* (2013.01); *Y04S 20/42* (2013.01)

(58) Field of Classification Search
CPC ........ H04Q 9/00; G01D 4/004; Y02B 90/242; Y02B 90/246; Y04S 20/322; Y04S 20/42
USPC ..................................................... 340/870.02
See application file for complete search history.

(56) References Cited

U.S. PATENT DOCUMENTS

| | | | | |
|---|---|---|---|---|
| 4,804,957 A * | 2/1989 | Selph | ..................... | G01R 21/00 340/870.03 |
| 5,128,988 A * | 7/1992 | Cowell | ................ | H04M 11/002 379/106.03 |
| 6,100,817 A * | 8/2000 | Mason et al. | ............ | 340/870.02 |
| 8,279,080 B2 * | 10/2012 | Pitchford et al. | ........ | 340/870.02 |
| 2002/0035497 A1* | 3/2002 | Mazereeuw | ....... | G05B 23/0283 702/188 |
| 2002/0118119 A1* | 8/2002 | Hammond | ............... | 340/870.02 |
| 2005/0270173 A1* | 12/2005 | Boaz | ........................ | 340/870.02 |

(Continued)

*Primary Examiner* — Sisay Yacob
(74) *Attorney, Agent, or Firm* — Muncy, Geissler, Olds & Lowe, P.C.

(57) ABSTRACT

A method of remotely reading electricity consumption data in a system that includes isolated electricity meters and a server for processing consumption data. Each isolated electricity meter being provided with communications means for transmitting the consumption data specific thereto over a communications network of the wired or mobile telephone network type. The consumption data from a plurality of isolated meters is initially transmitted over the wired or mobile telephone type communications network to a unit that collects and stores temporarily the consumption data from a plurality of isolated meters, and the consumption data stored temporarily by the unit is subsequently sent in grouped manner to the server. The invention relates to energy distribution networks.

8 Claims, 2 Drawing Sheets

(56) References Cited

U.S. PATENT DOCUMENTS

| | | | |
|---|---|---|---|
| 2006/0071812 A1* | 4/2006 | Mason, Jr. | G01D 4/004 340/870.02 |
| 2007/0073866 A1 | 3/2007 | Rudran | |
| 2007/0139219 A1* | 6/2007 | Crider | G01D 4/004 340/870.02 |
| 2008/0042874 A1 | 2/2008 | Rogai | |
| 2008/0068214 A1* | 3/2008 | Garrison Stuber | G01D 4/006 340/870.02 |
| 2009/0045976 A1* | 2/2009 | Zoldi et al. | 340/870.02 |
| 2009/0207042 A1* | 8/2009 | Park et al. | 340/870.02 |
| 2009/0256686 A1* | 10/2009 | Abbot | G01R 22/063 340/12.32 |

\* cited by examiner

METHOD FOR REMOTELY READING ELECTRIC METERS

The invention relates to remotely establishing an electricity consumption data statement in a system that includes a server for processing consumption data, which server is in communication with electricity meters that transmit said data.

BACKGROUND OF THE INVENTION

Drawing up a statement for an electricity meter consists in recovering data representative of electricity consumption as measured by the meter, e.g. for the purpose of establishing a bill for the consumption. This operation may be performed by a technician who notes the consumption data displayed by each meter, but several methods are known for reading meters remotely that make it possible to avoid using such a technician.

Each meter is then fitted with a modem in order to set up a connection with a consumption data processing server in order to transfer consumption data from each meter to the server.

The connection used is generally a data transmission connection making use in particular of a wired or mobile telephone type network, which data may be transmitted to the telephone network over various channels.

The data may be transmitted via a channel of a public switched telephone network (PSTN), i.e. over a wired connection using a modem of the type used to connect a computer to an Internet access supplier, generally referred to as a PSTN modem.

The data may also be transmitted over a GMS/Data channel, i.e. via a wireless connection using a modem that is similar to those fitted to mobile telephones of the GMS type (global system for mobile communication). Data transmission then takes place in a manner analogous to transmitting text messages in the short message service (SMS) format.

The data may also be transmitted to the telephone network over a global packet radio service (GPRS) channel, i.e. a connection set up by a high data rate wireless modem of the GPRS type.

Concretely, the consumption data from each meter is transferred meter by meter to the server, since each meter needs to set up a call with the server in order to transfer its data.

In practice, the large number of telephone connections needed for reading all of the isolated meters in a set of meters mobilizes a large fraction of the resources of the server. The resources available for processing the data proper are thus reduced, thereby penalizing the time required for processing all of the consumption data.

OBJECT OF THE INVENTION

The object of the invention is to provide a solution for remedying the above drawbacks.

SUMMARY OF THE INVENTION

To this end, the invention provides a method of remotely reading electricity consumption data in a system that includes isolated electricity meters and a server for processing consumption data from each isolated meter, each isolated electricity meter being provided with communications means for transmitting the consumption data specific thereto over a communications network of the wired or mobile telephone network type, wherein the consumption data from a plurality of isolated meters is initially transmitted over the wired or mobile telephone type communications network to a unit that collects and stores temporarily the consumption data from a plurality of isolated meters, and wherein the consumption data stored temporarily by the unit is subsequently sent in grouped manner to the server.

With this solution, consumption data coming from isolated meters is sent to the server in grouped manner, such that the server no longer needs to set up telephone connections. The server thus has more resources available for processing the data proper.

The invention also provides a method as defined above, in which the consumption data from a plurality of distinct isolated meters is converted into a common format prior to being sent to the server.

The server may thus be configured to process input data in a single format, thereby contributing to improving the performance of the server concerning data processing.

The invention also provides a system for implementing the above method, in which the server and the collection and temporary storage unit for the consumption data correspond to distinct computer terminals.

With this architecture, the collection of the data and its processing may thus be performed by different operators, as often happens in practice.

The invention also provides a system as defined above, in which the unit for collection and temporary storage of consumption data comprises a plurality of computer terminals that are interconnected by a local network, and the consumption data from the isolated meters is stored in at least two distinct terminals in redundant manner.

The invention also provides a system as defined above, in which the unit for collection and temporary storage of consumption data includes a computer terminal dedicated to transferring data from each isolated meter towards the unit.

DETAILED DESCRIPTION OF THE INVENTION

Figure 1:
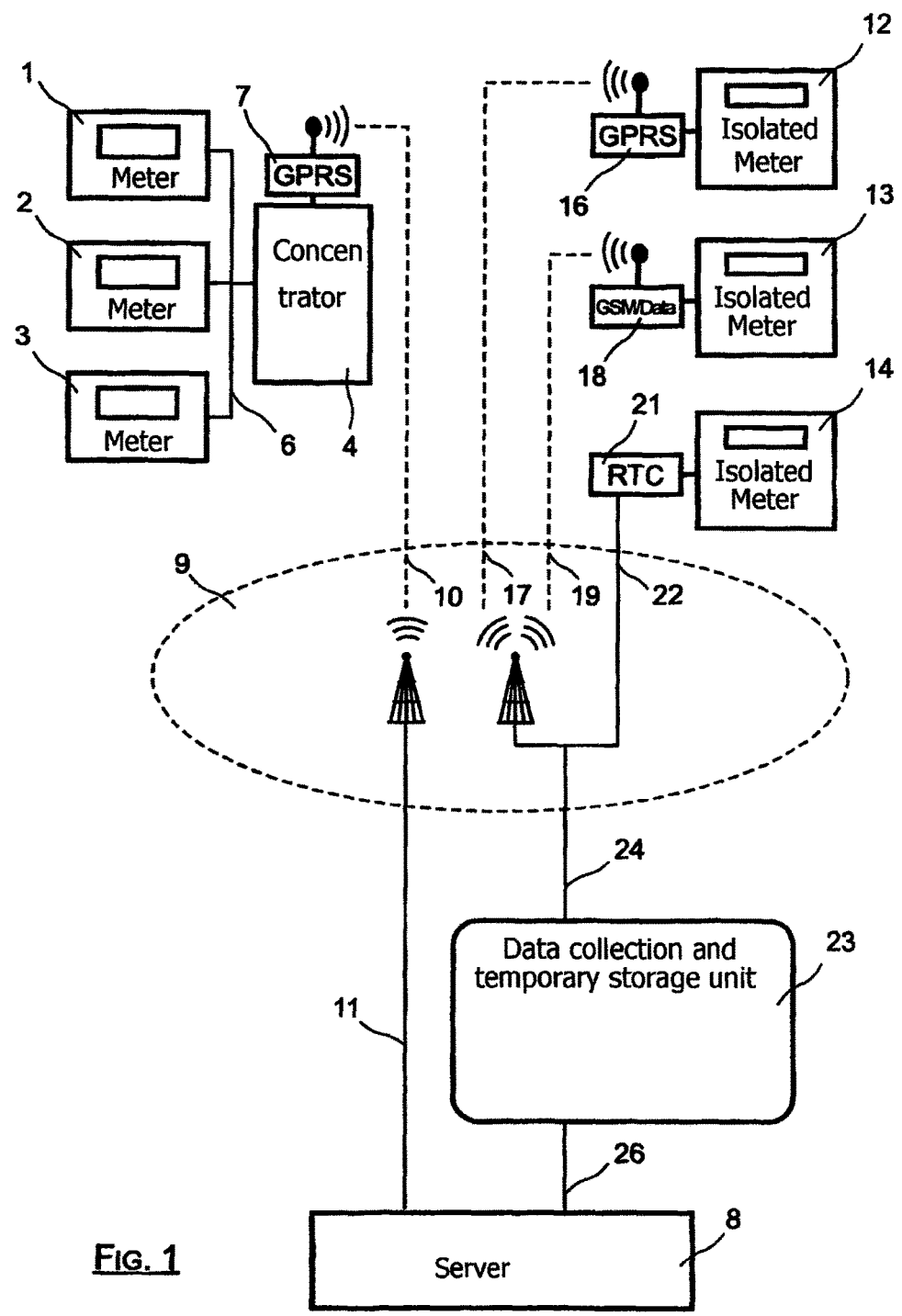
FIG. 1 is a diagram of the system in which the invention is implemented.

The system shown in FIG. 1 comprises a set or three separate meters identified by 1, 2, and 3 that are physically close to one another. The meters are united in clusters by being connected to a single terrain concentrator referenced 4, via a power line carrier current data transmission connection referenced 6.

The terrain concentrator 4 is suitable for bidirectional data exchange with each of the three meters 1, 2, and 3 so as to interrogate them in turn in order to recover consumption data from each of the meters. The terrain concentrator 4 is fitted with a modem 7 for transmitting the consumption data of these various meters 1, 2, and 3 in grouped manner to a data processor server, given reference 8.

The modem 7 is of the GPRS type for wireless data transmission in then form of packets via a data transmission connection making use in particular of a wired and/or mobile telephone type communications network given reference 9.

The network 9 is a wired or mobile telephone network serving in particular to transfer digital data by wire or wirelessly. Data may be transferred to the network 9 by wire via a PSTN or other type of modem. Data may also be transferred to the network 9 wirelessly, via a GSM/Data type modem or indeed by GPRS.

In the present example, the modem 7 transmits data into the network 9 by GPRS, represented symbolically by a dashed line referenced 10. The connection over which data is transmitted from the modem 7 to the server 8 then travels via an Ethernet connection referenced 11, over which the data that has been conveyed by the telephone network 9 is delivered to the server 8.

When the data representative of the consumption of each of the meters 1 to 3 is received by the server 8, it is broken down and processed thereby, e.g. in order to draw up corresponding consumption statements.

This system also includes three isolated meters 12, 13, and 14. The first isolated meter 12 is fitted with a GPRS modem belonging specifically thereto, identified by reference 16 or transmitting data to the telephone network 9 via a GPRS channel referenced 17, which data relates to consumption by that portion of the electricity network that is metered by this meter.

The second isolated meter 13 is also fitted with its own modem, given reference 18. This modem is of the GSM/Data type for transmitting data to the telephone network 9 over a GSM/Data channel referenced 19, which data relates to the consumption of the portion of the electricity network it meters. The third isolated meter 14 is fitted with a PSTN type modem given reference 21, in order to transmit data to the telephone network 9 via a PSTN channel given reference 22, which data relates to the consumption of that portion of the electricity network that is metered by this meter.

Thus, via the communications means as constituted by the modems 16, 18, and 21, the three isolated meters 12, 13, and 14 transmit the corresponding consumption data in individual manner to the telephone network 9.

The data transmitted by each of these three meters 12, 13, and 14 is conveyed over the telephone network 9 so as to be subsequently transferred via a connection 24, possibly of the Ethernet type, to a unit 23 for collection and temporary storage of the data, said connection 24 connecting the unit 23 to the telephone network 9.

Thus, the transmission line over which the data from each isolated meter 12, 13, 14 is transferred passes in succession via: the telephone network 9, by means of a PSTN, GMS/Data, or indeed GPRS channel; then the wired connection 24 so as to reach the unit 23 for collection and temporary storage of the data. The consumption data from the various isolated meters such as the meters 12, 13, and 14 is then sent in grouped manner to the server 8 via another wired connection 26 connecting the unit 23 to the server 8.

The unit 23 thus collects the consumption data coming from each isolated meter 12, 13, 14 in order to store it prior to sending it in grouped manner to the server 8. As shown diagrammatically in FIG. 1, the server 8 may be connected for this purpose to the unit 23 via a wired connection 26 such as an Ethernet connection.

Since the server 8 receives the consumption data from the isolated meters 12 to 14 in grouped manner, it processes that data in the same manner as if it were receiving consumption data coming from meters united in a cluster in order to establish consumption statements.

The temporary data collection and storage unit 23 constitutes a virtual concentrator given that it presents the server 8 with data that is grouped in the same manner as if it had been aggregated by the terrain concentrator situated upstream from the telephone network 9, even though it is in fact aggregated downstream from the telephone network 9.

Figure 2:
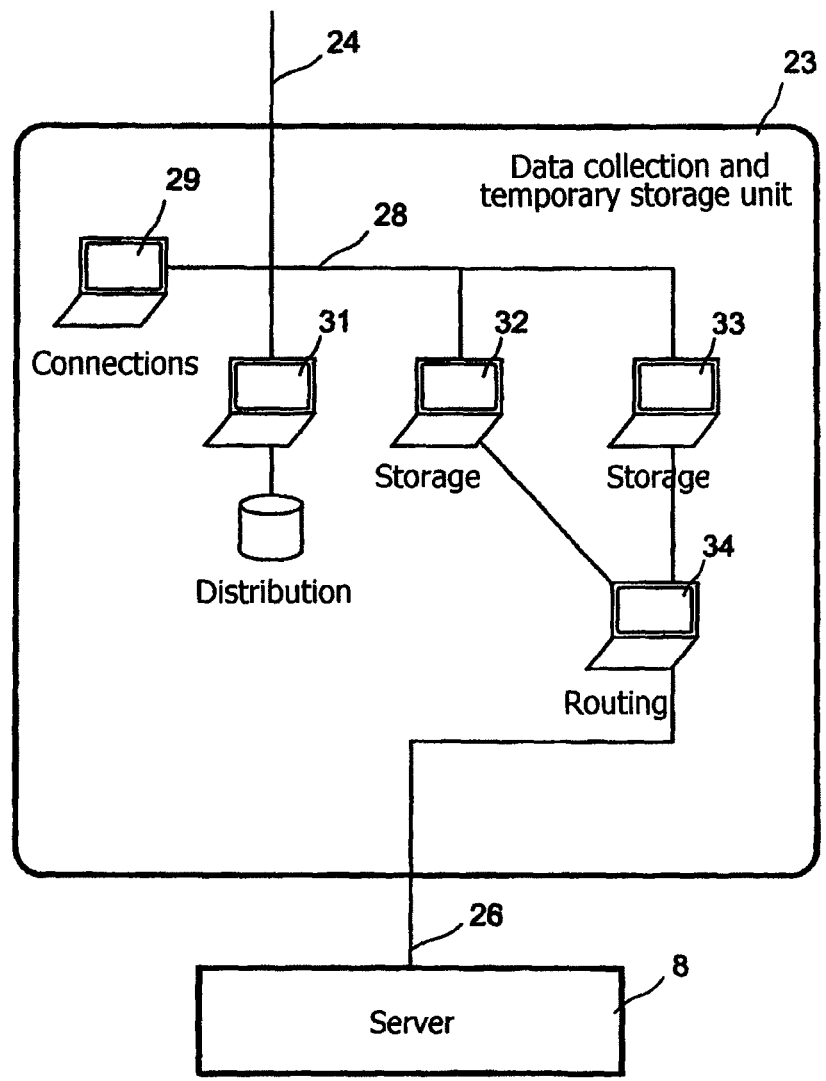
FIG. 2 is another diagram showing a collection and storage unit of the invention.

The unit 23 is shown diagrammatically in FIG. 2. It comprises a plurality of computer terminals connected together by a local network 28, and also connected to the telephone network 9 and to the server 8 via wired connections 24 and 26.

More particularly, the unit 23 has a telephone call terminal 29 suitable for connecting to each of the isolated meters 12, 13, 14 via the telephone network 9 in order to recover the consumption data from said meters.

Once the data from a meter has been received in the terminal 29, it is forwarded to a second terminal, given reference 31, that constitutes a data distributor. The distributor 31 sends the received consumption data to a plurality of other terminals, here referenced 32 and 33, that constitute redundant storage terminals.

The storage terminals 32 and 33 are connected to a routing terminal 34 so as to provide the server 8 with the consumption data they have stored temporarily.

In practice, once the consumption data from a sufficient quantity of isolated meters has been stored in the terminals 32 and 33 of the unit 23, the data is transmitted to the server 8 by the routing terminal 34.

This transmission may take place in packets, in application of the communications protocol used between the unit 23 and the server 8, but with the consumption data from a plurality of isolated meters being transferred in grouped manner in a single transmission.

It should be observed that in general, bidirectional communication is established between each isolated meter 12 and 13 and the unit 23: the unit 23 interrogates each isolated meter in succession in order to request the transmission of consumption data, with the data from each isolated meter being collected in entirely autonomous manner by the unit 23. Analogously, software updates for the system in each isolated meter may be transmitted by the unit 23 for installation in the meters.

In the example shown in the figures, the unit 23 is embodied by computer terminals that are distinct from the terminal running the server. However the unit 23 may also be constituted merely by a software application that is distinct from the application constituting the server 8. The application constituting the unit 23 and the server 8 may thus be run on a single computer terminal.

The invention provides the following advantages in particular:

It enables isolated electricity meters to be managed using a server that is dedicated to processing information coming from meters united in clusters, without there being any need to modify the server.

So far as the server is concerned, there is no difference in how it handles meters that are united in clusters and meters that are isolated, since the data coming from the terrain concentrator 4 and the data coming from the unit 23 is all addressed to the server 8 in the same format. The unit 23 thus provides the same logical interface as the terrain concentrator 4.

The unit 23 thus serves to reduce the load on the server, since the server no longer has to handle communications with each isolated meter, nor does it need to handle a diary telling it when isolated meters need to be read.

The resources needed for operating the server are thus reduced and server optimization is made significantly easier by the fact that it needs to handle only one format input data.

Because of the redundancy of the data storage terminals 32 and 33, the consumption data that has been collected in the unit 23 will not be lost.

What is claimed is:

1. A method of remotely reading electricity consumption data in a system that includes isolated electricity meters that measure electricity consumption and a server for processing consumption data from each isolated electricity meter, each isolated electricity meter being provided with communications means for transmitting the consumption data specific thereto over a wired telephone communications network via a wired telephone modem or a mobile telephone communications network via a mobile telephone modem, wherein the isolated electricity meters initially independently transmit the consumption data over the wired telephone communications network or the mobile telephone communications network to a unit that collects and stores temporarily the consumption data from the isolated electricity meters, and wherein the consumption data stored temporarily by the unit is subsequently sent in grouped manner to the server, the unit interrogating each isolated meter in succession in order to request the transmission of consumption data, the server establishing consumption statements from the consumption data, the unit being connected to the server via a wired connection or being integrated in the same computer terminal as the server.

2. The method according to claim 1, wherein the consumption data from each of the isolated electricity meters is converted into a common format prior to being sent to the server.

3. A system for implementing the method according to claim 1, wherein the server and the data collection and temporary storage unit for the consumption data correspond to distinct computer terminals.

4. The system according to claim 3, wherein the unit for collection and temporary storage of consumption data comprises a plurality of computer terminals that are interconnected by a local network, and wherein the consumption data from the isolated electricity meters is stored in at least two distinct terminals in redundant manner.

5. The system according to claim 4, wherein the unit for collection and temporary storage of consumption data includes a computer terminal dedicated to transferring data from each isolated electricity meter towards the unit.

6. The method according to claim 1, wherein the isolated electricity meters are situated upstream from the wired telephone communications network or the mobile telephone communications network, and the unit and the server are situated downstream from the wired telephone communications network or the mobile telephone communications network.

7. A unit that is connected to isolated electricity meters on one side over a wired telephone communications network or a mobile telephone communications network, and to a server for processing consumption data from each isolated electricity meter on the other side, the unit interrogating each isolated meter in succession in order to request the transmission of consumption data, the unit collecting and storing temporarily the consumption data from the isolated electricity meters, the unit sending the consumption data in grouped manner to the server, the unit being connected to the server via a wired connection, the server and the unit corresponding to distinct computer terminals.

8. The unit according to claim 7, including a computer terminal dedicated to transferring data from each isolated electricity meter towards the unit.

* * * * *